US010936039B2

(12) United States Patent
Guim Bernat et al.

(10) Patent No.: US 10,936,039 B2
(45) Date of Patent: Mar. 2, 2021

(54) MULTI-TENANT EDGE CLOUD SYSTEM POWER MANAGEMENT

(71) Applicant: Intel Corporation, Santa Clara, CA (US)

(72) Inventors: Francesc Guim Bernat, Barcelona (ES); Suraj Prabhakaran, Aachen (DE); Timothy Verrall, Pleasant Hill, CA (US); Karthik Kumar, Chandler, AZ (US); Mark A. Schmisseur, Phoenix, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 120 days.

(21) Appl. No.: 16/011,842

(22) Filed: Jun. 19, 2018

(65) Prior Publication Data

US 2019/0041960 A1    Feb. 7, 2019

(51) Int. Cl.
| | |
|---|---|
| *G06F 1/3234* | (2019.01) |
| *H04L 29/08* | (2006.01) |
| *G06F 9/50* | (2006.01) |
| *H04L 12/24* | (2006.01) |
| *G06F 1/3293* | (2019.01) |

(Continued)

(52) U.S. Cl.
CPC .......... *G06F 1/3234* (2013.01); *G06F 1/3293* (2013.01); *G06F 9/5072* (2013.01); *H04L 41/0896* (2013.01); *H04L 41/5051* (2013.01); *H04L 67/10* (2013.01); *G06F 1/3206* (2013.01); *H04L 43/08* (2013.01)

(58) Field of Classification Search
CPC .... G06F 1/3234; G06F 1/3293; G06F 9/5072; H04L 41/0896; H04L 41/5051; H04L 67/10
See application file for complete search history.

(56) References Cited

U.S. PATENT DOCUMENTS

| | | | | |
|---|---|---|---|---|
| 2012/0072749 A1* | 3/2012 | Conroy | ................. | G06F 1/3206 713/322 |
| 2015/0215228 A1* | 7/2015 | McMurry | ............. | H04L 47/822 709/226 |

(Continued)

FOREIGN PATENT DOCUMENTS

WO    2018093638 A1    5/2018

OTHER PUBLICATIONS

PCT, International Search Report and Written Opinion issued in International Patent Application No. PCT/US2019/032930, dated Aug. 29, 2019; 12 pages.

*Primary Examiner* — Nimesh G Patel
(74) *Attorney, Agent, or Firm* — Alliance IP, LLC (57) ABSTRACT

In one embodiment, an apparatus of an edge computing system includes memory that includes instructions and processing circuitry coupled to the memory. The processing circuitry implements the instructions to process a request to execute at least a portion of a workflow on pooled computing resources, the workflow being associated with a particular tenant, determine an amount of power to be allocated to particular resources of the pooled computing resources for execution of the portion of the workflow based on a power budget associated with the tenant and a current power cost, and control allocation of the determined amount of power to the particular resources of the pooled computing resources during execution of the portion of the workflow.

25 Claims, 5 Drawing Sheets

(51) Int. Cl.
*G06F 1/3206* (2019.01)
*H04L 12/26* (2006.01)

(56) References Cited

U.S. PATENT DOCUMENTS

| | | | |
|---|---|---|---|
| 2016/0054780 A1* | 2/2016 | Bodas | G06F 1/3228 |
| | | | 713/320 |
| 2017/0060574 A1 | 3/2017 | Malladi et al. | |
| 2017/0064037 A1 | 3/2017 | Das et al. | |
| 2017/0068521 A1 | 3/2017 | Monfort et al. | |
| 2017/0201585 A1 | 7/2017 | Doraiswamy et al. | |
| 2017/0366412 A1* | 12/2017 | Piga | G06F 9/00 |
| 2018/0027060 A1* | 1/2018 | Metsch | G06F 3/065 |
| | | | 709/226 |

* cited by examiner

Fig. 4

MULTI-TENANT EDGE CLOUD SYSTEM POWER MANAGEMENT

TECHNICAL FIELD

Embodiments described herein generally relate to power management, and more particularly to power management for pooled computing resources of edge computing systems.

BACKGROUND

Edge computing is an emerging technology in which computing is performed at the "edge" of a network (e.g., closer to base stations/network routers and the devices producing the data and requests for computation). Edge gateway servers may be equipped with pools of memory and storage resources in order to be able to perform computation in real-time for low latency requirement applications, such as, for example, autonomous driving or video surveillance and threat detection. Edge computing enables an entirely new class of applications (e.g., network functions such as virtual network functions (VNFs)) which cannot leverage conventional cloud computing, due to latency requirements. Edge computing systems may be resource and power constrained as compared with cloud computing systems. Current techniques for managing resource and power consumption at edge computing systems utilize static pools of resources with particular power budgets associated with each static pool, which may be inefficient. There is no current technique for dynamically managing resource and power consumption for pooled computing resources.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Figure 1:
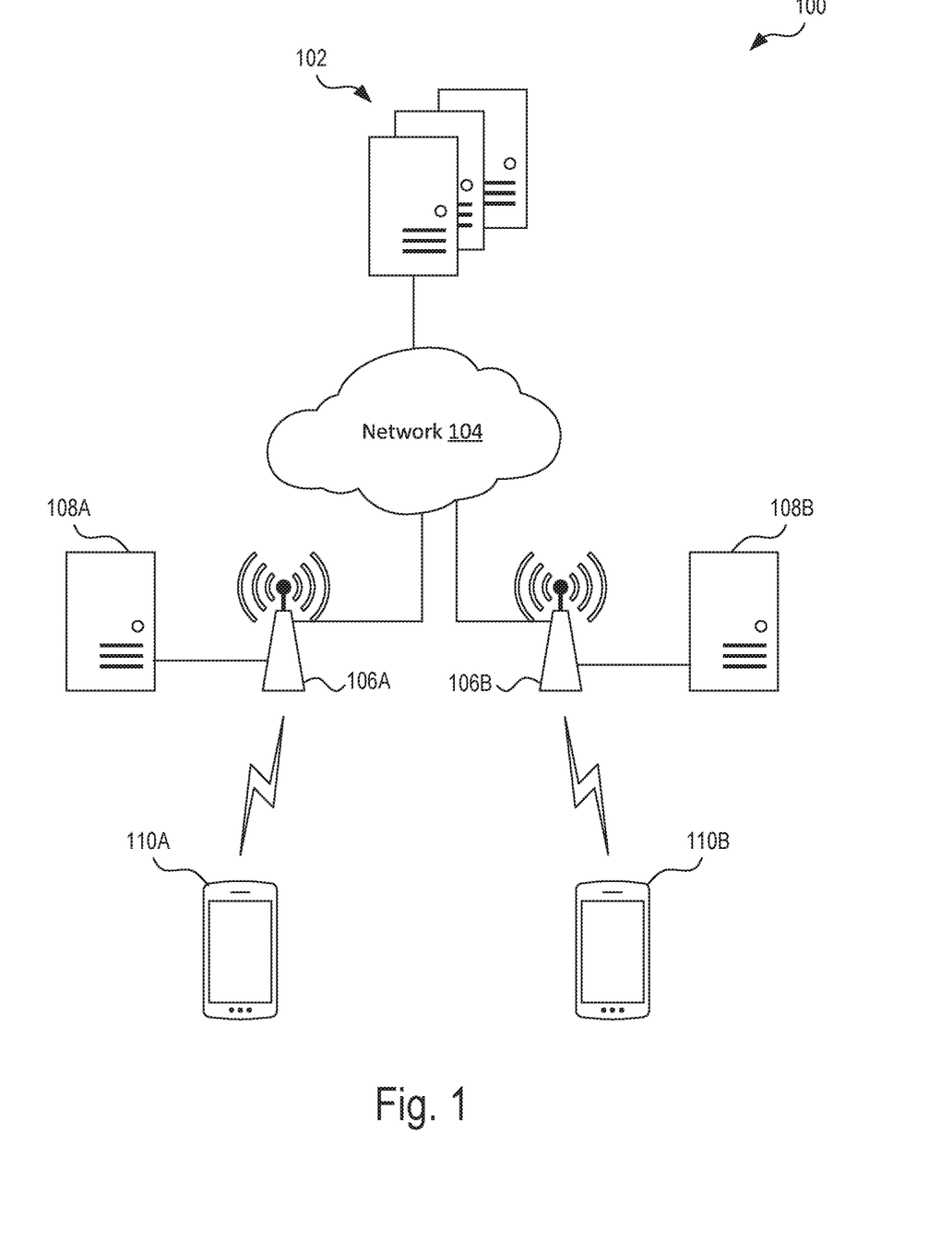
FIG. 1 is a diagram of an example edge cloud computing system according to one embodiment.

FIG. 1 is a diagram of an example edge cloud computing system 100 according to one embodiment. The example system 100 includes cloud computing systems 102 coupled, through network 104, to base station devices 106. The base station devices 106 wirelessly connect to user equipment (UE) devices 110 according to a wireless communication protocol. The base station devices 106 may include NodeBs, eNodeBs, gNodeBs, or other types of base stations, and may communicate with the UE devices 110 according to a 3G, 4G, 5G, or another type of cellular communication protocol. The example edge cloud computing system 100 may include fewer, additional, or other components than those shown in FIG. 1.

In the example shown, the base station devices 106 are communicably coupled to edge computing systems 108. The edge computing systems 108 may include computing resources used to perform computations or other operations for the UE devices 110 in a real-time or near real-time manner. For example, the edge computing systems 108 may be equipped with pools of memory and storage resources to perform workflows based on requests from the UE devices 110. The workflows may include services, virtual network functions (VNFs), or other types of operations. The edge computing systems 108 may be configured similar to the edge computing system 200, or in another manner.

By placing the edge computing systems 108 closer to the UE devices 110 (relative to the cloud computing systems 102), one or more advantages may be realized. For example, the edge computing systems 108 may service and respond to multiple applications running on UE devices 110 (e.g., object tracking, video surveillance, connected cars, etc.) in a faster manner than the cloud computing systems 102. Thus, the edge computing systems 108 may provide service to these applications in a low-latency manner, and may be able to meet ultra-low latency requirements certain applications may have. In addition, the edge computing systems 108 may enable certain types of applications, such as VNFs, which might not be able to utilize the cloud computing systems 102 due to latency requirements.

In some instances, the edge computing systems 108 may be resource constrained. Accordingly, there may be pressure to efficiently utilize the computing resources of the edge computing systems 108. In some cases, this may be accomplished by pooling computing resources, such as memory or storage. The pooled computing resources may be dynamically provisioned to execute workflows from UE devices 110, but there is no current means for dynamically controlling the allocation of power to the computing resources to increase/decrease power consumption. As such, the cost of the power consumption might not be attributable to the various tenants utilizing the computing resources. In some embodiments, the edge computing systems 108 may pool resources, such as memory accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local.

According to aspects of the present disclosure, power allocation may be controlled dynamically, enabling attribution of power consumption on a per-tenant, per-service, per-network function (e.g., per-VNF), per-multiple services (which may be chained), per-multiple network functions (which may be chained), or other bases. Certain aspects may therefore enable power-consumption to be a factor in the cost associated with edge computing system resource utilization. Thus, if a tenant wishes to consume higher bandwidth in the memory pool, for example, additional power can be shifted to that tenant's allocated memory in the pool of resources and the additional power costs associated with the increased bandwidth can be attributed back to that tenant (e.g., for billing or other purposes). One or more of the following advantages may be realized, in some instances: less maintenance (a key ingredient for multi-access edge computing (MEC) where 100KX base stations are deployed; more compute effective density (better total cost of ownership); automatic power scaling, metering and billing based on a multi-tenant architecture; and accelerated power and billing response time.

Figure 2:
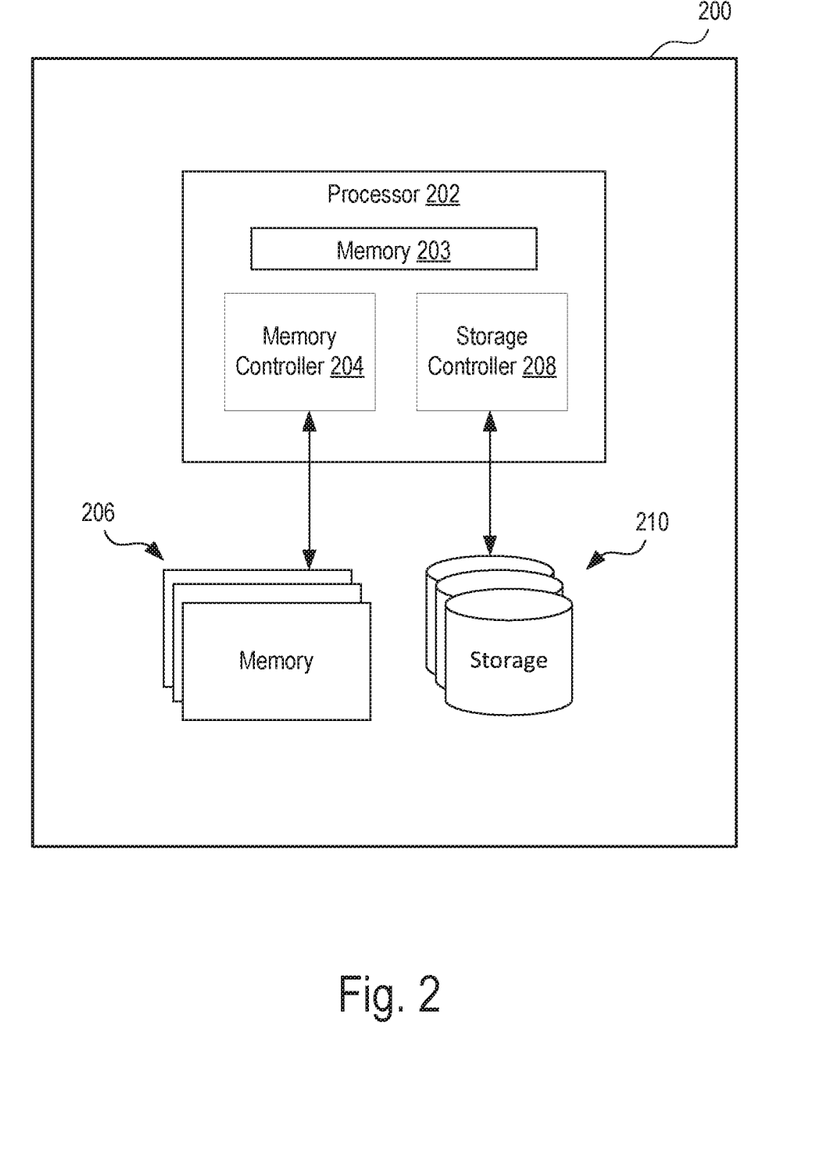
FIG. 2 is a simplified block diagram of an example edge computing system according to one embodiment.

FIG. 2 is a simplified block diagram of an example edge computing system 200 according to one embodiment. The example edge computing system 200 may be implemented by a software-defined infrastructure (SDI) architecture, in which resources may be defined by applications, and composite nodes may be created from a set of available resources on an application-by-application basis. In some edge computing systems, the resource selection and allocation for the application may be done by a resource manager (or POD manager), which may be operated separately from, or within, an orchestrator. Traditional architectures may be composed by a set of static platforms or nodes Ns={N1, . . . , Nm} that the resource manager may allocate to the application based upon characteristics, properties, and/or requirements. Each node may include a set of resources with certain characteristics (e.g., performance, capacity, etc.). In SDI architectures, applications may be executed on top of a composite node, which may be dynamically created by a POD manager (e.g., an Intel® Rack Scale Design Pod Manager, in some embodiments), or created based upon user or application instructions in some embodiments.

In some cases, a Rack Scale Design may include a hardware architecture that includes the ability to dynamically compose physical hardware resources into the most optimal configuration (e.g., composed or composite node) for each workload using an open application programming interface standard. These composite nodes, which may be composed by different resources that are disaggregated from the platform and distributed in different parts of the data center, may be virtualized to the application and are shown as an isolated and "local" resource. In other words, resources may be physically spread out remotely from a computing platform and connected via a fabric.

In some embodiments, the edge computing system 200 may expose a set of pools of resources, such as pooled memory 206 and pooled storage 210, each comprising one or more nodes of its respective resource, to an orchestrator and system software stack. The orchestrator may, based on user requests or application requests and given power budgets (as described herein), may request to the POD manager to compose a node based on those requirements. The composed node may be defined by the POD manager and returned to orchestrator. Once a composed node is defined by the POD manager and received by the orchestrator, an application may be booted and deployed on the composed node, which may include one or more resources from the pooled memory 206, pooled storage 210, or both.

The example edge computing system 200 includes a processor 202, memory 203, a memory controller 204 for controlling access to pooled memory resources 206, and a storage controller 208 for controlling access to pooled storage resources 210. The example edge computing system 200 may include fewer, additional, or other components than those shown in FIG. 2.

The processor 202 includes processing circuitry that executes instructions, for example, to control power allocation to the pooled memory and storage resources 206, 210, as described herein. The memory 203 may store the instructions for execution by the processing circuitry of the processor 202, and may include read-only memory (ROM). The instructions stored in the memory 203 and executed by the processor 202 may include programs, codes, scripts, or other types of data for execution. The processor 202 may be or include a general-purpose microprocessor, as a specialized co-processor or another type of data processing apparatus. In some instances, the processor 202 includes multiple processors, processing cores, or data processing apparatuses.

The memory controller 204 manages requests from the processing circuitry of the processor 202 to access the pooled memory 206. The memory controller 204 may control read and write operations performed on the pooled memory 206 or other types of operations. The memory controller 204 may be implemented similar to the memory controller 304 of FIG. 3A, or in another manner. The storage controller 208 manages requests from the processing circuitry of the processor 202 to access the pooled storage 210. The storage controller 208 may control read and write operations performed on the pooled storage 210 or other types of operations. The storage controller 208 may be implemented similar to the storage controller 314 of FIG. 3A, or in another manner. The memory controller 204, the storage controller 208, or both may be implemented by circuitry within the processor 202 (e.g., as shown) or may be implemented by circuitry distinct from the processing circuitry of the processor 202.

The pooled memory 206 and pooled storage 210 include one or more computer-readable media. The pooled memory 206 may include volatile memory devices, such as random access memory (RAM) devices. For example, the pooled memory 206 may include a number of dual in-line memory modules (DIMMs) accessible by the processor 202. The DIMMs may include dynamic access RAM, such as double data rate synchronous dynamic RAM (DDR SDRAM). The pooled storage 210 may include non-volatile memory devices. For example, the pooled storage 210 may include a number of hard disk drives, solid state drives, or other types of non-volatile data storage apparatuses accessible by the processor 202.

The pooled memory 206, the pooled storage 210, or both may be implemented by computer readable media within the same computing device or system housing the processor 202 (e.g., as shown) or may be implemented by computer readable media distinct from, but communicably coupled to, the computing device or system housing the processor 202. For example, in some instances, the edge computing system 200 may include a server device housing the processor 202 that is communicably coupled to one or more sled devices housing the pooled memory 206 and one or more sled devices housing the pooled storage 210 (e.g., in a rack environment). In certain embodiments, the edge computing system 200 may implement a network function virtualization (NFV) platform for execution of VNFs on the edge computing system 200. The pooled memory 206 and pooled storage 210 may include sleds of the respective resources. The sleds may include a pool of accelerator resources—such as co-processors and/or FPGAs, for example—that is globally accessible to other sleds of the system via optical fabric and a dual-mode optical switching infrastructure.

Figure 3A:
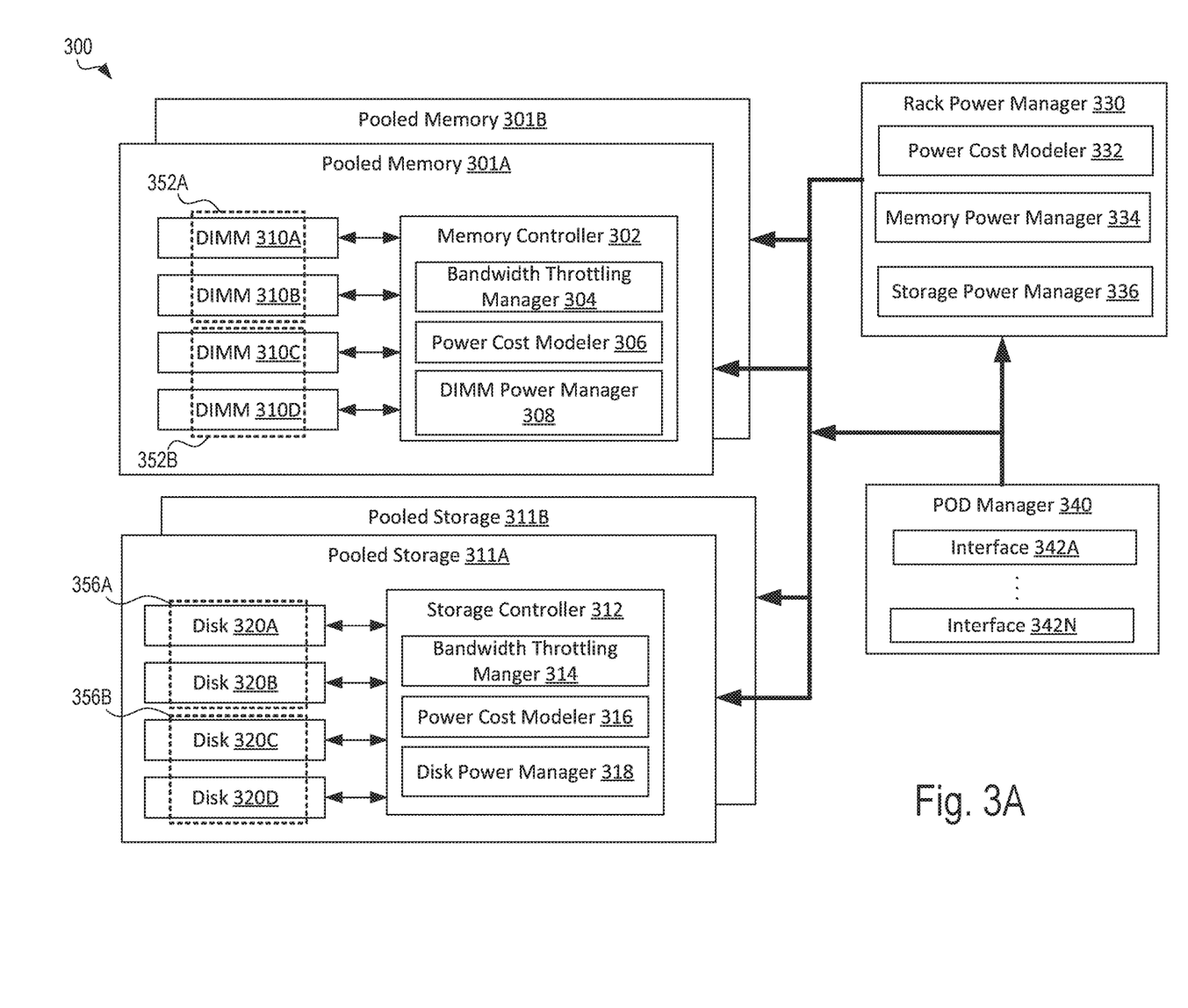
FIG. 3A is a simplified block diagram of an example system for controlling power allocation to pooled computing resources during execution of workflows according to one embodiment.

FIG. 3A is a simplified block diagram of an example system 300 for controlling power allocation to pooled computing resources during execution of workflows according to one embodiment. The example system 300 may be implemented on an edge computing system such as the edge computing systems 108 of FIG. 1 and edge computing system 200 of FIG. 2. The example system 300 may include fewer, additional, or other components than those shown in FIG. 3A.

In the example shown, the system 300 includes multiple sets of pooled memory platforms 301 and pooled storage platforms 311. The pooled memory platforms 301 may be implemented similar to the pooled memory 206 of FIG. 2, and the pooled storage platforms 311 may be implemented similar to the pooled storage 210 of FIG. 2. The pooled memory platforms 301 each include multiple DIMMs 310, and the pooled storage platforms each include multiple disks 311. In some cases, each pooled memory platform 301 may be implemented by a sled device, each pooled storage platform 311 may be implemented by a sled device, or both.

The example system 300 may allow for smart rack and platform power management to specify and how much power is to be allocated on a per-tenant, per-service, per network function, per-multiple services, per-multiple network functions, basis in each of the computing resource platforms 301, 311 that expose pooled memory or storage. In some cases, such as in a multi-rack computing system, the system 300 may include additional rack power managers 330 (e.g., a rack power manager 330 for each rack in the system).

In some instances, the system 300 includes a rack power manager 330 communicably coupled to the pooled memory platforms 301 and pooled storage platforms 311. The rack power manager 330 may control power allocation to the computing resources of the pooled memory platforms 301 and pooled storage platforms 311. The example rack power manager 330 includes a power cost modeler 332, a memory power manager 334, and a storage power manager 336. The power cost modeler 332 determines an amount of power to be allocated to particular platforms 301, 311 for execution of a service, network function (e.g., VNF), or other operation based on a per-tenant, per-service (or multiple services), per-network function (or multiple network functions) power budget and a current power cost. The power cost modeler 332 may determine the power to be allocated based on a power consumption model for the particular computing resources. The power consumption model may model an amount of power consumed by memory or storage resources per unit of data, per unit of time (e.g., W/GB/sec). Based on the power consumption determination, the memory power manager 334, storage power manager 336, or both may control power allocation (e.g., by implement a throttling scheme) for the respective resources during execution of the operation. In some cases, the power allocation decision may be communicated to the computing resource controllers 302, 312 on the platforms 301, 311, respectively.

The memory controller 302 and storage controller 312 may each control allocation of power on a per-DIMM (or group of DIMMs) or per-disk (or group of disks) basis, respectively. In some instances, the resources controllers 302, 312 may control allocation of power using different voltage rail or voltage regulators, or by controlling an amount of bandwidth being used or provided to each tenant, service, or network function. The resource controllers 302, 312 may, in some cases, control how tenants and their network functions or services are mapped to the different DIMMs/disks or power domains within a platform.

The example memory controller 302 includes a bandwidth throttling manager 304, a power cost modeler 306, and a DIMM power manager 308. The example storage controller 312 includes a bandwidth throttling manager 314, a power cost modeler 316, and a disk power manager 318. The bandwidth throttling managers 304, 314 control a bandwidth provided for use by a tenant, service, or network function to DIMMs 310 or disks 320, respectively, based on a power budget determined on a per-tenant, per-service (or multiple service), or per-network function (or multiple network function) basis. The power cost modelers 306, 316 determine an amount of power to be allocated to particular DIMMs 310 or disks 320, respectively, for execution of a service, network function, or other operation. The power cost modelers 306, 316 determine the power to be allocated to the DIMMs 310 or disks 320 based on a power consumption model for the respective computing resources. In some cases, the power cost modelers 306, 316 are implemented similar to the power cost modeler 332 of the rack power manager 330. The DIMM power manager 308 and disk power manager 318 control power allocation (e.g., by implement a throttling scheme) for the DIMMs 310 and disks 320, respectively, during execution of the operation. The power managers 308, 318 may control power allocation to the DIMMs 310 and disks 320, respectively, based on a power consumption determination made by the power modelers 306, 316, respectively.

The rack power manager 330 may allow tenants to configure a power budget (e.g., in terms of $/unit of time or any derived metric) allocated per-tenant, per-service (or multiple service), or per-network function (e.g., per-VNF, or multiple VNF). In some cases, the rack power manager 330 allows tenants to configure how power is to be used over time (e.g., specific power states over time, a range of power states, or other types of power state controls based on performance/watt or other metrics). The power budget may specify a cost per unit time (e.g., dollars per nanosecond of use). In addition, the rack power manager 330 (via the memory power manager 334, the storage power manager 336, or both) may manage power or resource bandwidth throttling to control power consumption when computing resources are being accessed by tenants. Depending on the power budget available and the associated configuration, an amount of memory or bandwidth allocated to tenants, services, or network functions may be capped to keep the specified ranges.

In some cases, the rack power manager 330 may provide automatic service degradation detection for each tenant, service, or network function (e.g., VNF), and any detected degradation may be automatically notified back to orchestration layers of a NFV platform implemented on an edge computing system hosting the rack power manager 330. In some instances, the rack power manager 330 may also track power consumption on a per tenant basis, and may manage billing or other configurable elements based on the power consumption. The rack power manager 330 may utilize a telemetry model that tracks the execution of the services, network functions, or other operations (e.g., functions-as-a-service (FaaS) or AFaaS), a level of utilization that each of those operations consume, or other information associated with the execution of the operations on the pooled computing resources. The tracked information may be analyzed to identify and predict potential service degradation based on the requests being received. In some instances, the rack power manager 330 may cause the edge computing system to reject requests to perform a particular type of function or operation based on the current available power or power characteristics.

In some instances, the system 300 also includes a POD manager 340 communicably coupled to the rack power manager 330 and to the pooled memory platforms 301 and pooled storage platforms 311. The POD manager 340 includes interfaces 342 that allow tenants to specify a power budget (e.g., $/ns) can be consumed by particular services, network functions, or other operations accessing pooled computing resources. In some cases, the POD manager 340 may configure the rack power manager 330 to control power allocation to the pooled memory platforms 301 and pooled storage platforms 311 over time, such as when specific platforms 301, 311 are being fully utilized by a particular tenant with the same power budget constraints. In some cases, the POD manager 340 may configure the memory and storage controllers 302, 312 of the memory and storage platforms 301, 311, respectively, such as when certain services or network functions are sharing the platform with other tenants. In such instances, no overall platform power capping may be implemented and control of power allocation may be performed at the DIMM/disk (or multiple DIMM/disk) level (e.g., by throttling how much bandwidth is actually used). The POD manager 340 may, based on a current cost of the power and utilization of pooled computing resources (memory or storage) by a tenant, service, or network function: (1) configure to the rack power manager 330 to control the amount of power provided to a particular memory platform 301 or storage platform 311 in accordance with a budgeted power allocation, or (2) configure the memory controller 302, the storage controller 312, or both to control the amount of power provided to particular DIMMs or disks utilized by the tenant or how much bandwidth is actually used by the tenant (which may translate to power costs). In some instances, the POD manager 340 may implement a telemetry model similar to the telemetry model described above.

Figure 3B:
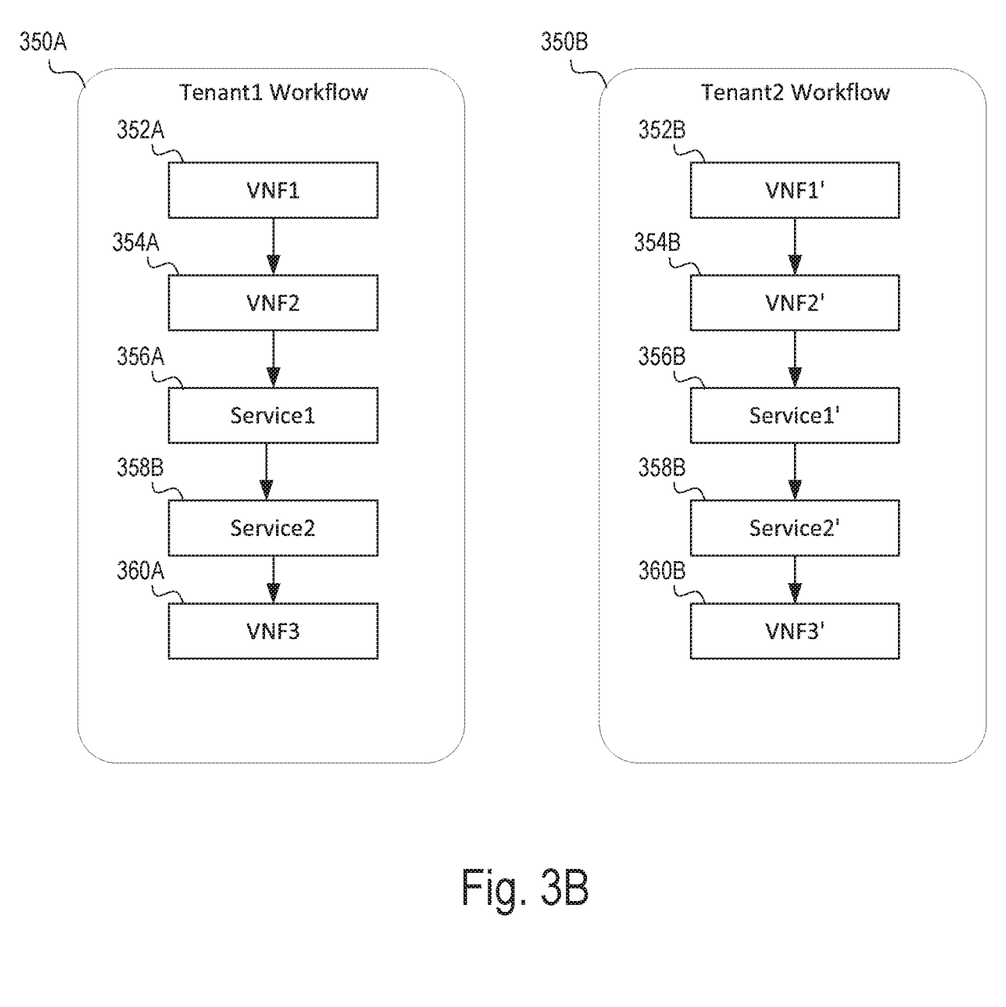
FIG. 3B is a diagram showing example workflows for two tenants in an edge cloud computing system according to one embodiment.

FIG. 3B is a diagram showing example workflows 350 for two tenants in an edge cloud computing system (e.g., the edge cloud computing system 100 of FIG. 1) according to one embodiment. In the example shown, the workflows 350 are the same for each tenant. The example workflows 350 each include a first network function (VNF1) 352, a second network function (VNF2) 354, a first service (Service1) 356, a second service (Service2) 358, and a third network function (VNF3) 360. In some instances, however, each tenant may set a different power budget (as described above) for execution of workflows (e.g., on a per-tenant, per-service (or multiple service), or per-network function (or multiple network function) basis), and accordingly, power may be allocated to pooled computing resources differently for execution of the two workflows 350. For instance, referring to FIG. 3A, the first network function 352A of workflow 350A utilizes DIMMs 310A, 310B, while the first network function 352AB of workflow 350B utilizes DIMMs 310C, 310D. Each tenant in this example may have allocated a different power budget for execution of the first network function 352. For example, Tenant1 may have allocated a higher power budget for execution of the first network function 352 than Tenant2. Accordingly, the memory controller 302 may allocate more power (e.g., through higher bandwidth via the bandwidth throttling manager 304, higher voltage allocation via the DIMM power manager 308, or both) to DIMMs 310A, 310B than to DIMMs 310C, 310D. As another example, referring again to FIG. 3A, the first service 356A of workflow 350A utilizes disks 320A, 320B, while the first service 356AB of workflow 350B utilizes disks 320C, 320D. Each tenant in this example may have allocated a different power budget for execution of the first service 356. For example, Tenant1 may have allocated a higher power budget for execution of the first service 356 than Tenant2. Accordingly, the storage controller 312 may allocate more power (e.g., through higher bandwidth via the bandwidth throttling manager 314, higher voltage allocation via the disk power manager 318, or both) to disks 320A, 320B than to disks 320C, 320D.

Figure 4:
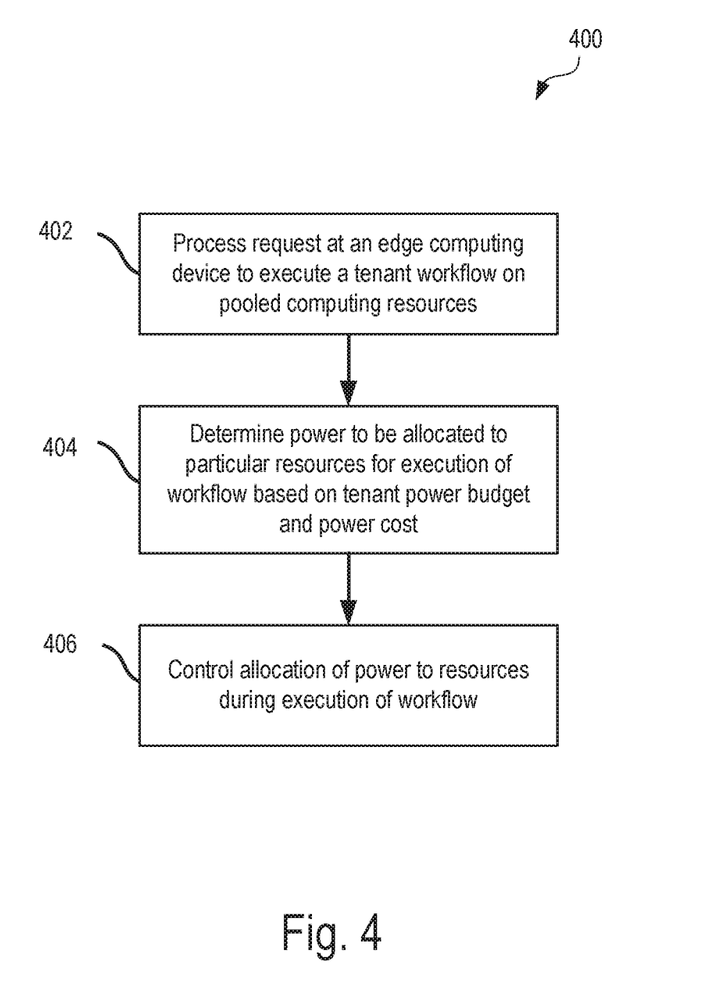
FIG. 4 is a flow diagram of an example process for controlling power allocation to pooled computing resources according to one embodiment.

FIG. 4 is a flow diagram of an example process 400 for controlling power allocation to pooled computing resources according to one embodiment. Operations in the example process 400 may be performed by one or more components of an edge computing device (e.g., one of the edge computing devices 108 of FIG. 1). The example process 400 may include additional or different operations, and the operations may be performed in the order shown or in another order. In some cases, one or more of the operations shown in FIG. 5 are implemented as processes that include multiple operations, sub-processes, or other types of routines. In some cases, operations can be combined, performed in another order, performed in parallel, iterated, or otherwise repeated or performed another manner.

At 402, a request to execute a tenant workflow on pooled computing resources is processed by an edge computing device. The workflow may include one or more of a virtual network function (VNF) and a service (e.g., as shown in FIG. 3B). One or more portions of the workflow (e.g., a service or VNF of the workflow) may be, based on the processing of the request, designated to execute on particular resources of pooled memory or storage resources (e.g., the pooled memory platforms 301 and pooled storage platforms 311 in FIG. 3A).

At 404, an amount of power to be allocated to particular resources of the pooled computing resources for execution of the workflow is determined based on a tenant power budget and a power cost. The power budget may specify based on at least one of a per-tenant, per-service, per-network function, per-multiple service, or per-multiple network function basis, and may specify a cost per unit time. Determining an amount of power to be allocated to the particular resources of the pooled computing resources may include, in some instances, determining a power consumption associated with execution of the portion of the workflow on the particular resources based on a power consumption model for the pooled computing resources. The power consumption model may specify an estimated power consumption per unit data per unit time.

At 406, allocation of power provided to the particular resources of the pooled computing resources is controlled during execute on of the workflow. In some cases, this may include controlling allocation of the determined amount of power on a per-DIMM basis (e.g., per-DIMM or group of DIMMs 310 by the memory controller 302 of FIG. 3A) or a per-disk basis (per-disk or group of disks 320 of FIG. 3A by the storage controller 312 of FIG. 3A), or on a per-computing resource platform basis (e.g., per-pooled memory platform 301 or per-pooled storage platform 311 by rack power manager 330 of FIG. 3A). In some cases, the computing resource platform managers (e.g., the rack power manager 330 of FIG. 3A) or computing resource controllers (e.g., the memory controller 302 or storage controller 312 of FIG. 3A) may be configured (e.g., by the POD manager 340) to implement control of the power allocation to the particular resources. In some cases, controlling power allocation includes controlling an amount of power provided to pooled computing resources (e.g., memory or storage) during execution, or throttling bandwidth provided to the pooled computing resources during execution.

In some instances, potential service degradations may be detected. For example, a potential service degradation which would be caused by execution of the workflow may be detected. In some instances, the potential service degradation may be detected using a telemetry model (similar to the one described above) that analyzes a level of power consumption for particular workflow operations over time. Based on the analysis, it may be determined whether execution of a workflow or portion of a workflow may cause a service degradation. In some cases, when a potential service degradation is detected, an alert may be generated, the request to execute the workflow may be rejected, or both. The telemetry model may be implemented by the rack power manager 330, the POD manager 340, or both.

In some embodiments, the system implementing the process 400 may detect that the portion of the workflow (service, network function, etc.) will not execute on the particular resources allocated for execution based on the determined amount of power to be allocated to the particular resources. The system may be a closed loop system, and may register performance callbacks to the system stack when a cost or performance cannot be achieved. The system may monitor the pooled memory or pooled storage resources and determine whether a service or network function may be run given certain power or performance considerations (e.g., based on the power budget specified), and may terminate the service/function if appropriate. For example, if a power required to execute a service or network function is greater than 100 W and a bandwidth to pooled memory resources for executing the service/network function is limited to less than 40 Gbps, then the system may determine that the service/network function may not execute.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments. It will be understood that certain examples listed below may be combined with other examples, or certain aspects of other examples.

Example 1 includes an apparatus of an edge computing device, comprising: memory comprising instructions; processing circuitry coupled to the memory to implement the instructions to: process a request to execute at least a portion of a workflow on pooled computing resources, the workflow being associated with a particular tenant; determine an amount of power to be allocated to particular resources of the pooled computing resources for execution of the portion of the workflow based on a power budget associated with the tenant and a current power cost; and control allocation of the determined amount of power to the particular resources of the pooled computing resources during execution of the portion of the workflow.

Example 2 includes the subject matter of Example 1, and optionally, wherein the portion of the workflow comprises one or more of a network function and a service, and the power budget is specified based on at least one of a per-tenant, per-service, per-multiple service, per-network function, or per-multiple network function basis.

Example 3 includes the subject matter of Example 1, and optionally, wherein controlling allocation of the determined amount of power comprises controlling allocation of power on at least one of a per-DIMM and a per-disk basis.

Example 4 includes the subject matter of Example 1, and optionally, wherein controlling allocation of the determined amount of power comprises controlling allocation of power on a per-computing resource platform basis.

Example 5 includes the subject matter of Example 1, and optionally, wherein the processing circuitry is further to configure at least one of a computing resource platform manager and a computing resource controller to implement the control of power allocation to the particular resources.

Example 6 includes the subject matter of Example 1, and optionally, wherein controlling allocation of the determined amount of power comprises controlling an amount of power provided to the pooled computing resources during execution of the portion of the workflow.

Example 7 includes the subject matter of Example 1, and optionally, wherein controlling allocation of the determined amount of power comprises controlling a bandwidth provided to the pooled computing resources during execution of the portion of the workflow.

Example 8 includes the subject matter of Example 1, and optionally, wherein determining an amount of power to be allocated to the particular resources of the pooled computing resources comprises determining a power consumption associated with execution of the portion of the workflow based on a power consumption model for the pooled computing resources.

Example 9 includes the subject matter of Example 8, and optionally, wherein the power budget specifies a cost per unit time, and the power consumption model specifies an estimated power consumption per unit data per unit time.

Example 10 includes the subject matter of Example 1, and optionally, wherein the processing circuitry is further to detect potential service degradation caused by execution of the workflow, wherein the potential service degradation is detected using a telemetry model that analyzes a level of power consumption for particular workflow operations over time.

Example 11 includes the subject matter of Example 11, and optionally, wherein the processing circuitry is further to reject the request based on detection of a potential service degradation.

Example 12 includes the subject matter of Example 1, and optionally, wherein the pooled computing resources comprise one or more of pooled memory resources and pooled storage resources.

Example 13 includes a non-transitory computer-readable medium comprising instructions that are, when executed by processing circuitry, to: process a request to execute at least a portion of a workflow on pooled computing resources, the workflow being associated with a particular tenant; determine an amount of power to be allocated to particular resources of the pooled computing resources for execution of the portion of the workflow based on a power budget associated with the tenant and a current power cost; and control allocation of the determined amount of power to the particular resources of the pooled computing resources during execution of the portion of the workflow.

Example 14 includes the subject matter of Example 13, and optionally, wherein the portion of the workflow comprises one or more of a network function and a service, and the power budget is specified based on at least one of a per-tenant, per-service, per-multiple service, per-network function, or per-multiple network service basis.

Example 15 includes the subject matter of Example 13, and optionally, wherein controlling allocation of the determined amount of power comprises controlling allocation of power on at least one of a per-DIMM and a per-disk basis.

Example 16 includes the subject matter of Example 13, and optionally, wherein controlling allocation of the determined amount of power comprises controlling allocation of power on a per-computing resource platform basis.

Example 17 includes the subject matter of Example 13, and optionally, wherein the instructions are further to configure at least one of a computing resource platform manager and a computing resource controller to implement the control of power allocation to the particular resources.

Example 18 includes the subject matter of Example 13, and optionally, wherein controlling allocation of the determined amount of power comprises controlling an amount of power provided to the pooled computing resources during execution of the portion of the workflow.

Example 19 includes the subject matter of Example 13, and optionally, wherein controlling allocation of the determined amount of power comprises controlling a bandwidth provided to the pooled computing resources during execution of the portion of the workflow.

Example 20 includes the subject matter of Example 13, and optionally, wherein determining an amount of power to be allocated to the particular resources of the pooled computing resources comprises determining a power consumption associated with execution of the portion of the workflow based on a power consumption model for the pooled computing resources.

Example 21 includes the subject matter of Example 20, and optionally, wherein the power budget specifies a cost per unit time, and the power consumption model specifies an estimated power consumption per unit data per unit time.

Example 22 includes the subject matter of Example 13, and optionally, wherein the instructions are further to detect potential service degradation caused by execution of the workflow, wherein the potential service degradation is detected using a telemetry model that analyzes a level of power consumption for particular workflow operations over time.

Example 23 includes the subject matter of Example 22, and optionally, wherein the instructions are further to reject the request based on detection of a potential service degradation.

Example 24 includes the subject matter of Example 13, and optionally, wherein the pooled computing resources comprise one or more of pooled memory resources and pooled storage resources.

Example 25 includes a method for edge computing device power management, comprising: processing a request at an edge computing device to execute at least a portion of a workflow on pooled computing resources coupled to the edge computing device, the workflow being associated with a particular tenant; determining an amount of power to be allocated to particular resources of the pooled computing resources for execution of the portion of the workflow based on a power budget associated with the tenant and a current power cost; and controlling allocation of the determined amount of power to the particular resources of the pooled computing resources during execution of the portion of the workflow.

Example 26 includes the subject matter of Example 25, and optionally, wherein the portion of the workflow comprises one or more of a network function and a service, and the power budget is specified based on at least one of a per-tenant, per-service, per-network function, per-multiple service, or per-multiple network function basis.

Example 27 includes the subject matter of Example 25, and optionally, wherein controlling allocation of the determined amount of power comprises controlling allocation of power on at least one of a per-DIMM and a per-disk basis.

Example 28 includes the subject matter of Example 25, and optionally, wherein controlling allocation of the determined amount of power comprises controlling allocation of power on a per-computing resource platform basis.

Example 29 includes the subject matter of Example 25, and optionally, wherein the processing circuitry is further to configure at least one of a computing resource platform manager and a computing resource controller to implement the control of power allocation to the particular resources.

Example 30 includes the subject matter of Example 25, and optionally, wherein controlling allocation of the determined amount of power comprises controlling an amount of power provided to the pooled computing resources during execution of the portion of the workflow.

Example 31 includes the subject matter of Example 25, and optionally, wherein controlling allocation of the determined amount of power comprises controlling a bandwidth provided to the pooled computing resources during execution of the portion of the workflow.

Example 32 includes the subject matter of Example 25, and optionally, wherein determining an amount of power to be allocated to the particular resources of the pooled computing resources comprises determining a power consumption associated with execution of the portion of the workflow based on a power consumption model for the pooled computing resources.

Example 33 includes the subject matter of Example 32, and optionally, wherein the power budget specifies a cost per unit time, and the power consumption model specifies an estimated power consumption per unit data per unit time.

Example 34 includes the subject matter of Example 25, and optionally, wherein the processing circuitry is further to detect potential service degradation caused by execution of the workflow, wherein the potential service degradation is detected using a telemetry model that analyzes a level of power consumption for particular workflow operations over time.

Example 35 includes the subject matter of Example 34, and optionally, wherein the processing circuitry is further to reject the request based on detection of a potential service degradation.

Example 36 includes the subject matter of Example 25, and optionally, wherein the pooled computing resources comprise one or more of pooled memory resources and pooled storage resources.

Example 37 includes a system, comprising: means for processing a request to execute at least a portion of a workflow on pooled computing resources, the workflow being associated with a particular tenant; means for determining an amount of power to be allocated to particular resources of the pooled computing resources for execution of the portion of the workflow based on a power budget associated with the tenant and a current power cost; and means for controlling allocation of the determined amount of power to the particular resources of the pooled computing resources during execution of the portion of the workflow.

Example 38 includes the subject matter of Example 37, and optionally, further comprising means for controlling allocation of the determined amount of power by controlling an amount of power provided to the pooled computing resources during execution of the portion of the workflow.

Example 39 includes the subject matter of Example 37, and optionally, further comprising means for controlling allocation of the determined amount of power by throttling an amount of bandwidth provided to the pooled computing resources during execution of the portion of the workflow.

Example 40 includes the subject matter of Example 37, and optionally, further comprising means for determining an amount of power to be allocated to the particular resources of the pooled computing resources by determining a power consumption associated with execution of the portion of the workflow based on a power consumption model for the pooled computing resources.

Example 41 includes the subject matter of Example 1, and optionally, wherein the processing circuitry is further to detect that the portion of the workflow will not execute on the particular resources based on the determined amount of power to be allocated to the particular resources.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of an edge computing system, comprising:
   memory comprising instructions;
   processing circuitry coupled to the memory to implement the instructions to:
   process a request to execute at least a portion of a workflow on pooled computing resources, the workflow being associated with a particular tenant;
   determine an amount of power to be allocated to particular resources of the pooled computing resources for execution of the portion of the workflow based on a power budget associated with the tenant and a current monetary cost of power, wherein determining the amount of power to be allocated comprises determining a power consumption associated with execution of the portion of the workflow based on a power consumption model for the pooled computing resources, the power budget specifying a monetary cost per unit time and the power consumption model specifying an estimated power consumption per unit data per unit time; and
   control allocation of the determined amount of power to the particular resources of the pooled computing resources during execution of the portion of the workflow.

2. The apparatus of claim 1, wherein the portion of the workflow comprises one or more of a network function and a service, and the power budget is specified based on at least one of a per-tenant, per-service, per-network function, per-multiple service, or per-multiple network function basis.

3. The apparatus of claim 1, wherein controlling allocation of the determined amount of power comprises controlling allocation of power on at least one of a per-DIMM and a per-disk basis.

4. The apparatus of claim 1, wherein controlling allocation of the determined amount of power comprises controlling allocation of power on a per-computing resource platform basis.

5. The apparatus of claim 1, wherein the processing circuitry is further to configure at least one of a computing resource platform manager and a computing resource controller to implement the control of power allocation to the particular resources.

6. The apparatus of claim 1, wherein controlling allocation of the determined amount of power comprises controlling an amount of power provided to the pooled computing resources during execution of the portion of the workflow.

7. The apparatus of claim 1, wherein controlling allocation of the determined amount of power comprises controlling a bandwidth provided to the pooled computing resources during execution of the portion of the workflow.

8. The apparatus of claim 1, wherein the processing circuitry is further to detect potential service degradation caused by execution of the workflow, wherein the potential service degradation is detected using a telemetry model that analyzes a level of power consumption for particular workflow operations over time.

9. The apparatus of claim 8, wherein the processing circuitry is further to reject the request based on detection of a potential service degradation.

10. The apparatus of claim 1, wherein the processing circuitry is further to detect that the portion of the workflow will not execute on the particular resources based on the determined amount of power to be allocated to the particular resources.

11. A non-transitory computer-readable medium comprising instructions that are, when executed by processing circuitry, to:
   process a request to execute at least a portion of a workflow on pooled computing resources, the workflow being associated with a particular tenant;
   determine an amount of power to be allocated to particular resources of the pooled computing resources for execution of the portion of the workflow based on a power budget associated with the tenant and a current monetary cost of power, wherein determining the amount of power to be allocated comprises determining a power consumption associated with execution of the portion of the workflow based on a power consumption model for the pooled computing resources, the power budget specifying a monetary cost per unit time and the power consumption model specifying an estimated power consumption per unit data per unit time; and
   control allocation of the determined amount of power to the particular resources of the pooled computing resources during execution of the portion of the workflow.

12. The non-transitory computer-readable medium of claim 11, wherein the portion of the workflow comprises one or more of a network function and a service, and the power budget is specified based on at least one of a per-tenant, per-service, per-network function, per-multiple service, or per-multiple network function basis.

13. The non-transitory computer-readable medium of claim 11, wherein controlling allocation of the determined amount of power comprises controlling allocation of power on at least one of a per-DIMM and a per-disk basis.

14. The non-transitory computer-readable medium of claim 11, wherein controlling allocation of the determined amount of power comprises controlling allocation of power on a per-computing resource platform basis.

15. The non-transitory computer-readable medium of claim 11, wherein the instructions are further to configure at least one of a computing resource platform manager and a computing resource controller to implement the control of power allocation to the particular resources.

16. The non-transitory computer-readable medium of claim 11, wherein controlling allocation of the determined amount of power comprises controlling an amount of power provided to pooled memory during execution of the portion of the workflow.

17. The non-transitory computer-readable medium of claim 11, wherein controlling allocation of the determined amount of power comprises controlling an amount of power provided to pooled storage during execution of the portion of the workflow.

18. The non-transitory computer-readable medium of claim 11, wherein controlling allocation of the determined amount of power comprises controlling a bandwidth provided to the pooled computing resources during execution of the portion of the workflow.

19. The non-transitory computer-readable medium of claim 11, wherein the instructions are further to detect potential service degradation caused by execution of the workflow, wherein the potential service degradation is detected using a telemetry model that analyzes a level of power consumption for particular workflow operations over time.

20. The non-transitory computer-readable medium of claim 19, wherein the instructions are further to reject the request based on detection of a potential service degradation.

21. A method for controlling power allocation to pooled computing resources of an edge computing system, comprising:
   processing a request at an edge computing device to execute at least a portion of a workflow on pooled computing resources coupled to the edge computing device, the workflow being associated with a particular tenant;
   determining an amount of power to be allocated to particular resources of the pooled computing resources for execution of the portion of the workflow based on a power budget associated with the tenant and a current monetary cost of power, wherein determining the amount of power to be allocated comprises determining a power consumption associated with execution of the portion of the workflow based on a power consumption model for the pooled computing resources, the power budget specifying a monetary cost per unit time and the power consumption model specifying an estimated power consumption per unit data per unit time; and
   controlling allocation of the determined amount of power to the particular resources of the pooled computing resources during execution of the portion of the workflow.

22. The method of claim 21, wherein the portion of the workflow comprises one or more of a network function and a service, and the power budget is specified based on at least one of a per-tenant, per-service, per-network function, per-multiple service, or per-multiple network function basis.

23. The method of claim 21, wherein controlling allocation of the determined amount of power comprises controlling allocation of power on at least one of a per-DIMM and a per-disk basis.

24. The method of claim 21, wherein controlling allocation of the determined amount of power comprises controlling allocation of power on a per-computing resource platform basis.

25. The method of claim 21, wherein controlling allocation of the determined amount of power comprises one or more of: controlling an amount of power provided to the pooled computing resources during execution of the portion of the workflow and controlling a bandwidth provided to the pooled computing resources during execution of the portion of the workflow.

* * * * *